(12) United States Patent
Choi et al.

(10) Patent No.: US 12,301,056 B2
(45) Date of Patent: May 13, 2025

(54) STATOR COMPRISING MULTIPLE-ROW ARMATURE WINDING WITH HIGH FILL FACTOR

(71) Applicants: HYUNDAI MOTOR COMPANY, Seoul (KR); KIA CORPORATION, Seoul (KR); IUCF-HYU (INDUSTRY-UNIVERSITY COOPERATION FOUNDATION HANYANG UNIVERSITY), Seoul (KR)

(72) Inventors: Jin Ho Choi, Suwon-si (KR); Jae Hyun Kim, Seoul (KR); Soo Hwan Park, Seoul (KR); Myung Seop Lim, Seoul (KR); Sung Woo Hwang, Seoul (KR)

(73) Assignees: HYUNDAI MOTOR COMPANY, Seoul (KR); KIA CORPORATION, Seoul (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 270 days.

(21) Appl. No.: 17/850,243

(22) Filed: Jun. 27, 2022

(65) Prior Publication Data

US 2023/0179034 A1   Jun. 8, 2023

(30) Foreign Application Priority Data

Dec. 3, 2021 (KR) .......................... 10-2021-0172202

(51) Int. Cl.
*H02K 1/16* (2006.01)
*H02K 3/28* (2006.01)
(Continued)

(52) U.S. Cl.
CPC ................. *H02K 1/16* (2013.01); *H02K 3/28* (2013.01); *H02K 3/50* (2013.01); *H02K 15/085* (2013.01); *H02K 2203/09* (2013.01)

(58) Field of Classification Search
CPC .. H02K 1/16; H02K 3/28; H02K 3/50; H02K 3/52; H02K 3/12; H02K 3/26; H02K 15/085; H02K 2203/09; H02K 15/0081
(Continued)

(56) References Cited

U.S. PATENT DOCUMENTS 3,488,532 A * 1/1970 Anderson ................ H02K 9/20
310/58
2007/0273218 A1* 11/2007 Atkinson ................ H02K 3/50
310/201

(Continued)

FOREIGN PATENT DOCUMENTS

JP   2009195009 A * 8/2009

OTHER PUBLICATIONS

JP 2009195009A Machine Translation (Year: 2009).*

*Primary Examiner* — Tran N Nguyen
*Assistant Examiner* — Masoud Vaziri
(74) *Attorney, Agent, or Firm* — MCDONNELL BOEHNEN HULBERT & BERGHOFF LLP

(57) ABSTRACT

A stator winding structure includes a stator core formed from a stack of a plurality of steel sheets, the stator core comprising a plurality of slots that are circularly arranged in multiple rows around an axis of rotation; a plurality of conductor bars positioned in the plurality of slots; a plurality of first barrier ribs electrically shielding between the plurality of conductor bars contiguous to each other in a radial direction; and a plurality of second barrier ribs electrically shielding between the plurality of conductor bars contiguous to each other in a circumferential direction; and a pair of (Continued)

end-turn members disposed at axial ends of the stator core and coupled to the conductor bars; wherein the plurality of conductor bars are arranged within the stator core by a casting process including die casting.

7 Claims, 6 Drawing Sheets

(51) Int. Cl.
    *H02K 3/50*     (2006.01)
    *H02K 15/085*     (2006.01)

(58) Field of Classification Search
    USPC .......................................................... 310/201
    See application file for complete search history.

(56) References Cited

U.S. PATENT DOCUMENTS

| | | | |
|---|---|---|---|
| 2013/0187512 A1* | 7/2013 | Buttner | H02K 15/0012 |
| | | | 310/211 |
| 2014/0042836 A1* | 2/2014 | Shiga | H02K 3/345 |
| | | | 310/45 |
| 2019/0252959 A1 | 8/2019 | Patzak et al. | |
| 2020/0007014 A1* | 1/2020 | Flower | H02K 1/16 |
| 2020/0235626 A1* | 7/2020 | Kümmlee | B63H 21/17 |
| 2021/0152043 A1* | 5/2021 | Leonardi | H02K 1/16 |
| 2021/0265887 A1* | 8/2021 | Kojima | H02K 3/12 |

* cited by examiner

STATOR COMPRISING MULTIPLE-ROW ARMATURE WINDING WITH HIGH FILL FACTOR

CROSS REFERENCE TO RELATED APPLICATIONS

This application claims priority to and the benefit of Korean Patent Application No. 10-2021-0172202 filed on Dec. 3, 2021, the disclosure of which is incorporated herein by reference in its entirety.

TECHNICAL FIELD

The present disclosure relates to a stator comprising a stator comprising a multiple-row armature winding with a high fill factor.

BACKGROUND

The description in this section merely provides background information related to the present disclosure and does not necessarily constitute the prior art.

Drive motors used in electric vehicles require high output and high efficiency. To this end, power semiconductors in controllers also are being increasingly developed to allow for high temperatures and high currents so that a higher current flows through a stator winding. The fill factor of the stator winding needs to be maximized in order to create a higher magnetic flux despite a limited motor size.

In induction motors which are asynchronous motors, the rotor's magnetic field is not in synchrony with the rotor's mechanical rotation rate. The slip between the rotation rate of the magnetic field and the rotation rate of the stator varies with rotation speed. That is, the frequency of the rotor's core and the frequency of the stator's core are different.

When an induction motor is run, heat is generated as a high-density current flows in a resistor. Notably, armature windings and the rotor's conductor bars generate high-temperature heat due to copper losses. The rise in the temperature of the conductor bars leads to increased specific resistance and therefore lowers motor efficiency due to increased copper losses. In order for the induction motor to produce a high output, a high current needs to be applied, and the armature windings are required to have only a small temperature rise or allow for a high temperature.

The most common type of stator winding is a coil-type winding with a circular cross-section, which is, however, disadvantageous in achieving high fill factors because of empty space between coils. Accordingly, supplying higher currents to the stator winding involves heat generation issues.

This can be solved by installing a cooling system near a heat generating portion so as to cool the stator winding by forced cooling, but the addition of the cooling system is still a drawback.

Alternatively, hairpin-like conductors exemplified in FIG. 1B or coils (not shown) with a rectangular cross-section are used. By using conductors having a larger cross-sectional area compared to coil-type windings exemplified in FIG. 1A, armature resistance can be reduced, which may result in less heat generation. However, assembling and fixing hairpins is a tricky process that requires connecting the ends exposed to both sides of the stator as illustrated in FIG. 1C, and, although there is automated equipment available for this process, it incurs excessively high costs. The coils with a rectangular cross-section also require considerably high manufacturing costs to assemble and connect the coils, and it is still not easy to achieve highest possible fill factors. These concentrated winding methods inevitably require assembling of coils to segmented cores, thus resulting in an increase in manufacturing costs.

That is, in order to improve the output density of drive motors, there is a need for a technology for manufacturing a stator's armature windings with high fill factors and low manufacturing costs.

SUMMARY

The present disclosure provides a stator winding structure for an induction motor in which armature windings have a high fill factor, are arranged in multiple rows, and are easy to manufacture.

According to at least one embodiment, the present disclosure provides a stator winding structure comprising a stator core formed from a stack of a plurality of steel sheets, the stator core comprising a plurality of slots that are circularly arranged in multiple rows around an axis of rotation; a plurality of conductor bars positioned in the plurality of slots, a plurality of first barrier ribs electrically shielding between the plurality of conductor bars contiguous to each other in a radial direction; and a plurality of second barrier ribs electrically shielding between the plurality of conductor bars contiguous to each other in a circumferential direction, and a pair of end-turn members disposed at axial ends of the stator core and coupled to the conductor bars, wherein the plurality of conductor bars are arranged within the stator core by a casting process including die casting.

A stator winding structure according to the present disclosure has the effect of providing a high-output, high-efficiency motor that makes manufacturing easy and provides high fill factor windings to a stator, by comprising multiple rows of slots surrounding a stator core and arranged in an axial direction of the motor, conductor bars formed in the multiple rows of slots by die casting, and the pair of end-turn members attached to both ends of the conductor bars and providing electrical connections between the conductor bars.

DETAILED DESCRIPTION

Figure 1A:
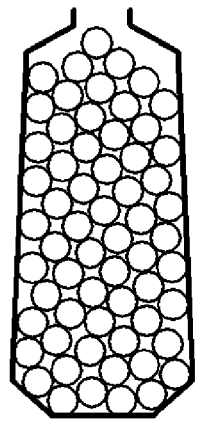
FIGS. 1A, 1B and 1C illustrate shapes of a typical stator's armature windings.
Figure 1B:
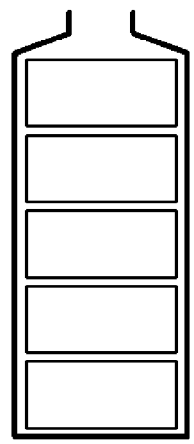
Figure 1C:
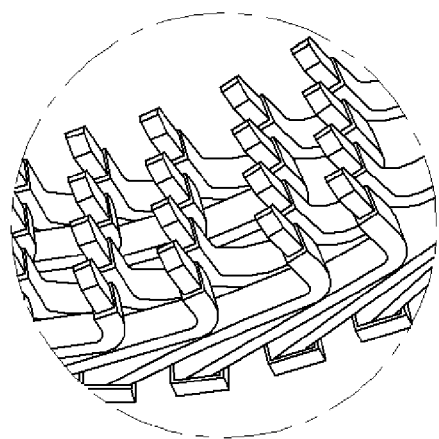

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

Figure 2:
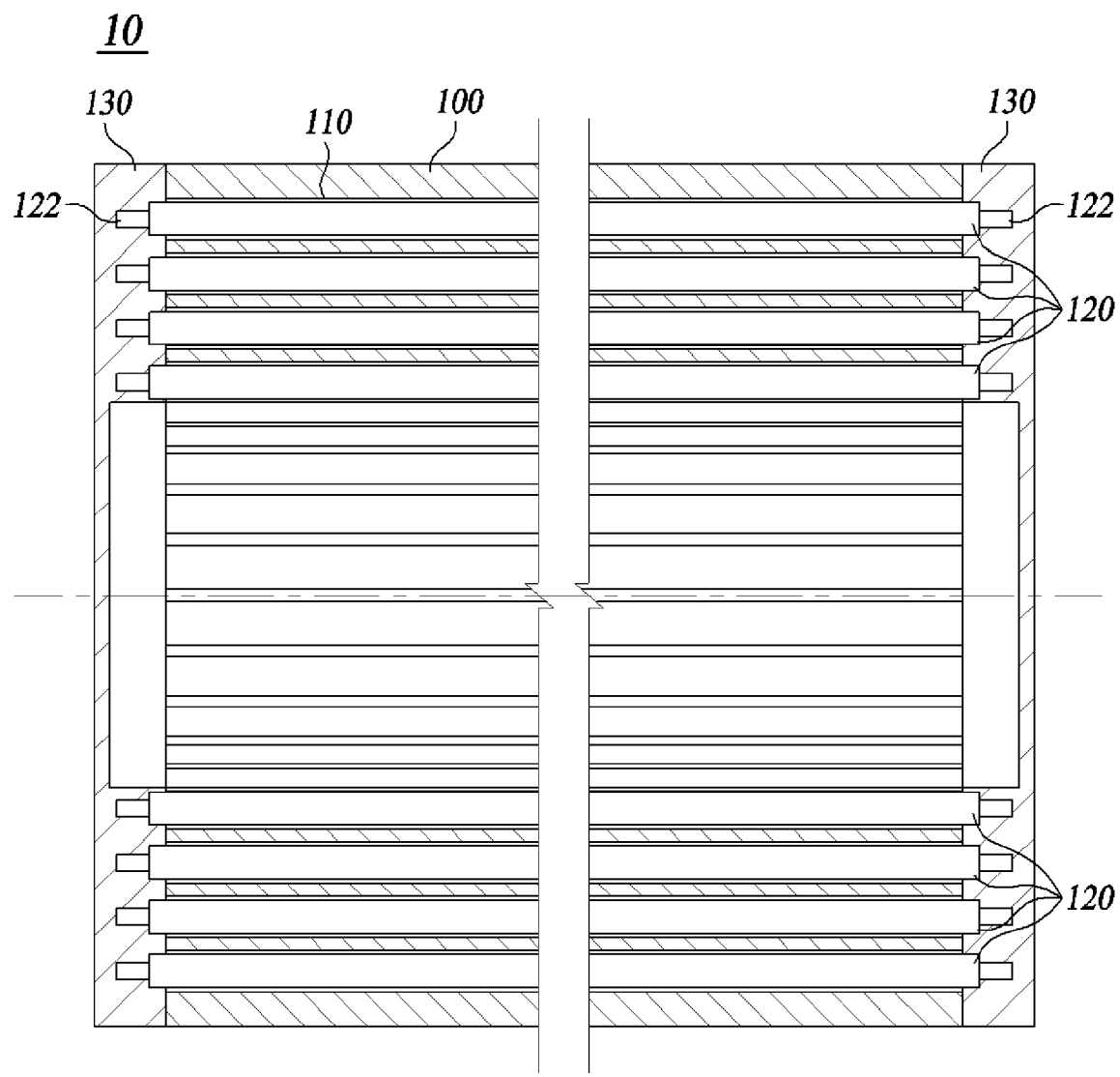
FIG. 2 is a cross-sectional view of a stator according to an embodiment of the present disclosure.

FIG. 2 is a cross-sectional view of a stator according to an embodiment of the present disclosure.

Referring to FIG. 2, a stator 10 according to an embodiment includes a plurality of conductor bars 120 positioned in a plurality of slots 110 of a laminated stator core 100 by a casting process including die casting, and a pair of end-turn members 130 connecting the plurality of conductor bars 120 to form a plurality of windings.

In the stator core 100, the plurality of slots 110 containing the plurality of conductor bars 120 are circularly arranged in multiple rows. Each of steel sheets (e.g., silicon steel sheets) constituting the stator core 100 or a stack of these steel sheets may include an insulating coating (not shown) made of phosphate or a ceramic material. A mold member (not shown) may be provided on both sides of the laminated stator core 100 in such a way that the plurality of conductor bars 120 protrude from both sides of the stator core 100. After casting the plurality of conductor bars 120, the mold member may be removed so that the plurality of conductor bars 120 are molded in such a way that end portions of the plurality of conductor bars 120 protrude from both sides of the stator core 100. The plurality of conductor bars 120 may be made of aluminum or copper.

The end 122 of each of the plurality of conductor bars 120 may be machined later to have a proper shape, tolerance, and surface roughness so that they are easily coupled to the pair of end-turn members 130 including connection members for connecting windings between the plurality of conductor bars 120.

The ends 122 of each of the plurality of conductor bars 120 may be connected in a zigzag across a multiple-row arrangement by means of a line connecting structure (not shown) inside the pair of end-turn members 130 so that a pair of plurality of conductor bars 120 surrounding the teeth of the stator core 100 and facing each other across the multiple-row arrangement are electrically connected to form a plurality of windings.

Figure 3:
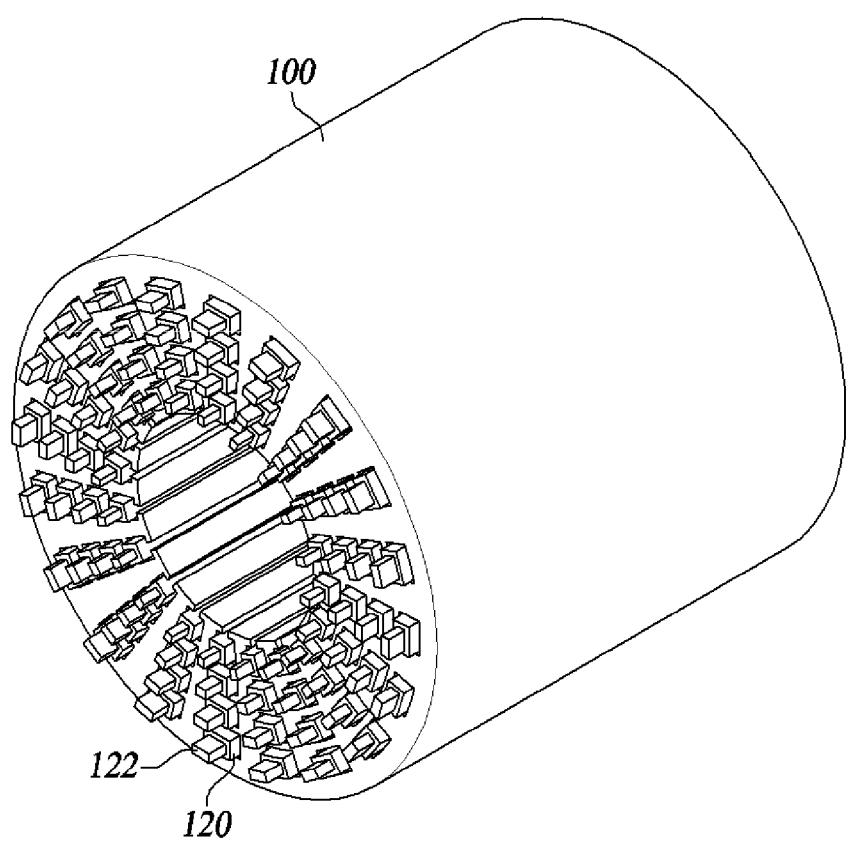
FIG. 3 is a perspective view of a stator core and conductor bars of a stator according to an embodiment of the present disclosure.

FIG. 3 is a perspective view of a stator core and conductor bars of a stator according to an embodiment of the present disclosure.

FIG. 3 illustrates how each of the plurality of conductor bars 120 are assembled to the stator core 100 after the casting of the plurality of conductor bars 120 and the machine-finishing of their ends.

Figure 4:
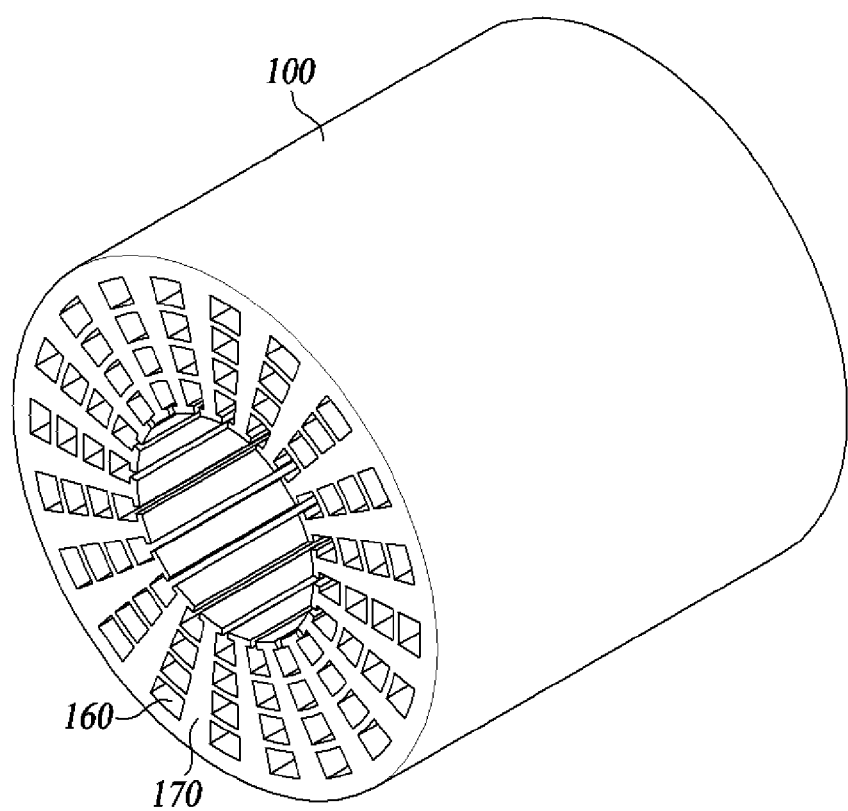
FIG. 4 is a perspective view of a stator core according to an embodiment of the present disclosure.

FIG. 4 is a perspective view of a stator core according to an embodiment of the present disclosure.

Referring to FIG. 4, stator slots 110 are formed in each of the steel sheets constituting the stator core 100 by means of a plurality of first barrier ribs 160 electrically shielding between the plurality of conductor bars 120 contiguous to each other in a radial direction of the stator 10 and a plurality of second barrier ribs 170 electrically shielding between the plurality of conductor bars 120 contiguous to each other in a circumferential direction of the stator 10.

The windings of the stator 10 according to an embodiment may provide a high fill factor since they are formed by casting to fill the stator slots 110. Also, the plurality of conductor bars 120 have a larger cross-sectional area than in usual cases, which allows for higher currents but generates less heat while the high currents are flowing owing to low specific resistance. Because of these characteristics, an embodiment of resistance welding between the pair of end-turn members 130 and the ends of the plurality of conductor bars 120 to be described later may be easily implemented.

Figure 5:
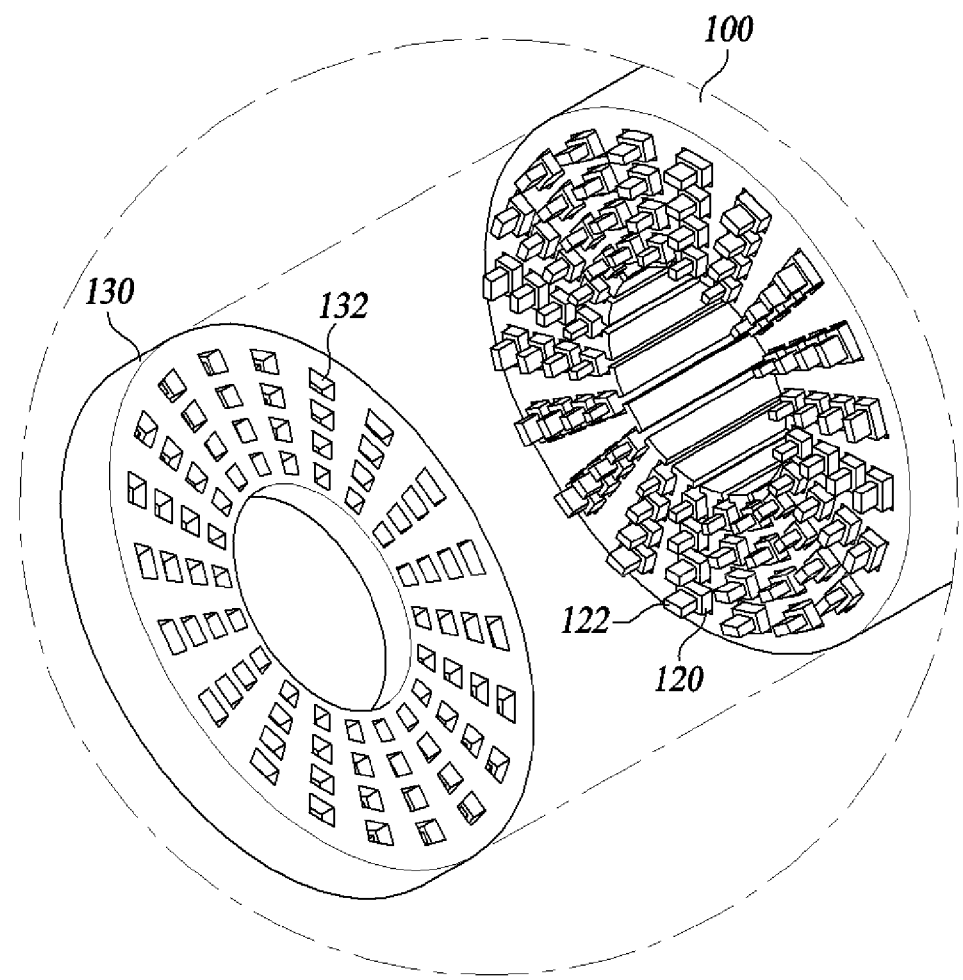
FIG. 5 is a perspective view of conductor bars and a pair of end-turn members according to an embodiment of the present disclosure.

FIG. 5 is a perspective view of conductor bars and the pair of end-turn members according to an embodiment of the present disclosure.

Referring to FIG. 5, the ends 122 of each of the plurality of conductor bars 120 are inserted into a plurality of pockets 132 on one side of the pair of end-turn members 130. The pair of end-turn members 130 may have a multi-layered structure along the length of the stator 10. The multi-layered structure may include one side where the plurality of pockets 132 are formed, a layer comprising connection members for providing proper electrical connections between the ends 122 of the plurality of conductor bars 120 while the ends 122 are coupled to the pockets 132, and a protective layer for protecting the connection members and the ends 122 from the outside. The pair of end-turn members 130 may be entirely made of a non-conductive material, and may have conductive connection members arranged inside. Alternatively, the body of the pair of end-turn members 130 may be made of a non-conductive material such as ceramic, and the same conductive material as the plurality of conductor bars 120 may be coated on the inner surfaces of the pockets 132 by metalizing.

The structure of the pair of end-turn members 130 connecting the ends 122 of the plurality of conductor bars 120 and sealing both sides of the stator 10 may be available in any form as long as it provides a required winding structure and provides reliable, electrical and physical connections.

In an exemplary embodiment, the pockets 132, which are formed by penetrating at least part of the pair of end-turn members 130 through the other side of the pair of end-turn members 130, and the ends 122 of the plurality of conductor bars 120 may be configured to fit together loosely. Also, grooves may be formed in at least part of gaps between the pockets 132 and the ends 122 so that the pockets 132 and the ends 122 are physically compressed and electrically and tightly coupled together. After preassembling of the pockets 132 and the ends 122, taper pins or taper members of the same material as the plurality of conductor bars 120 may be inserted and press-fitted into the grooves by wedging. A person skilled in the art will easily derive an assembly structure needed to automate this process. The taper pins or taper members according to the exemplary embodiment may be plastically deformed by press fitting, thereby providing secure coupling between the inner surfaces of the pockets 132 and the outer surfaces of the ends 122. Also, through-holes may be formed at both ends of the connection members to receive the ends 122, and the surfaces of the ends 122 may be plastically deformed by pressing and then assembled by caulking, for example.

Moreover, according to a further exemplary embodiment, larger gaps may be formed between the pockets 132 and the ends 122 in at least some region, by considering the windings on the plurality of conductor bars 120. After the preassembling of the pockets 132 and the ends 122, connection members included in the pair of end-turn members 130 may be provided in such a manner that they are press-fitted into gaps formed adjacent to the plurality of conductor bars 120 and the ends 122 which are to be connected together. That is, the pair of end-turn members 130 and the plurality of conductor bars 120 may be preassembled, and then a plurality of connection members may be press-fitted from the other side of the pair of end-turn members 130 by an automated machine, thereby completing the assembling and the winding.

Additionally, according to a further exemplary embodiment, although not shown, the pockets 132 of the pair of end-turn members 130 and the ends 122 of each of the plurality of conductor bars 120 may be physically and tightly attached together by press-fitting using connection members including taper pins, taper members, or a taper structure, and then may be joined together by locally melting them using resistance welding. The plurality of conductor bars 120 according to an embodiment have a large cross-sectional area so as to allow for high currents. In contrast, contact portions between the ends 122 and the pockets 132 may have much higher contact resistance than the bodies of the plurality of conductor bars 120. With this in consideration, high currents, for example, currents higher than those allowed for motors that are applied to the stator, may be allowed to flow between one end of the plurality of conductor bars 120 and the other end for an appropriate length of time, so that the contact portions are heated up to a temperature higher than a melting temperature for the material of the contact portions. Thus, the contact portions may be locally welded, thereby completing the assembling. Also, a wedge structure including taper pins may be assembled in such a way that additional pressure from both sides is exerted toward the stator core 100 in the case of resistance welding, so as to ensure secure welding in the contact portions.

In a stator structure according to embodiments of the present disclosure, the plurality of conductor bars 120 are formed and assembled in the stator core 100 in a batch process by casting including die casting, and the pair of end-turn members 130 allows connecting windings between the plurality of conductor bars 120 to be assembled in a way that is advantageous for automation. Thus, armature windings with high fill factors may be provided to allow for high currents, and high productivity may be achieved.

Furthermore, in the stator 10 according to an embodiment, the plurality of conductor bars 120 in a multiple-row arrangement may be assembled in a cartridge shape where the plurality of first barrier ribs 160 and the plurality of second barrier ribs 170 are incorporated together, and the preassembled plurality of conductor bars 120 may be inserted into the stator core 100 after being assembled in the slots.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

The invention claimed is:

1. A stator winding structure comprising:
a stator core formed from a stack of a plurality of steel sheets, the stator core comprising a plurality of slots that are circularly arranged in multiple rows around an axis of rotation;
a plurality of conductor bars positioned in the plurality of slots; a plurality of first barrier ribs electrically shielding between the plurality of conductor bars contiguous to each other in a radial direction; and
a plurality of second barrier ribs electrically shielding between the plurality of conductor bars contiguous to each other in a circumferential direction; and
a pair of end-turn members disposed at axial ends of the stator core and coupled to the conductor bars;
wherein the plurality of conductor bars are arranged within the stator core formed integrally and inseparably within the plurality of slots by a casting process including die casting;
wherein a middle portion of each of the plurality of conductor bars has substantially the same cross-sectional area as the corresponding slot in the plurality of slots; and
wherein each of the plurality of conductor bars comprises a pair of end portions at opposite longitudinal ends, the pair of end portions are formed and machined after the casting process, and a cross-sectional area of each of the pair of end portions is smaller than a cross-sectional area of the middle portion.

2. The stator winding structure of claim 1, wherein the pair of end-turn members comprise a plurality of pockets formed in the stator core to receive the pair of end portions.

3. The stator winding structure of claim 2, wherein the plurality of pockets are formed by penetrating at least part of the pair of end-turn members in a thickness direction.

4. The stator winding structure of claim 3, wherein a cross-sectional area of each of the plurality of pockets is greater than a cross-sectional area of at least a portion of each of the pair of end portions such that gaps are formed between the plurality of pockets and the pair of end portions in at least some region, and the plurality of pockets and the pair of end portions are attached by press-fitting taper pins, taper members, or a taper structure formed in part of the connection members into the gaps by wedging.

5. The stator winding structure of claim 2, wherein the connection members comprise through-holes formed at both ends to receive the pair of end portions of the plurality of conductor bars, and the pair of end portions and the connection members are attached together by caulking the pair of end portions.

6. The stator winding structure of claim 4, wherein, after the plurality of pockets and the pair of end portions are attached together by press-fitting, press-fitted contact portions are resistance-welded by contact resistance by applying a current to the plurality of conductor bars.

7. The stator winding structure of claim 6, wherein the current is higher than an operating current to be used for the stator.

* * * * *